2,778,857

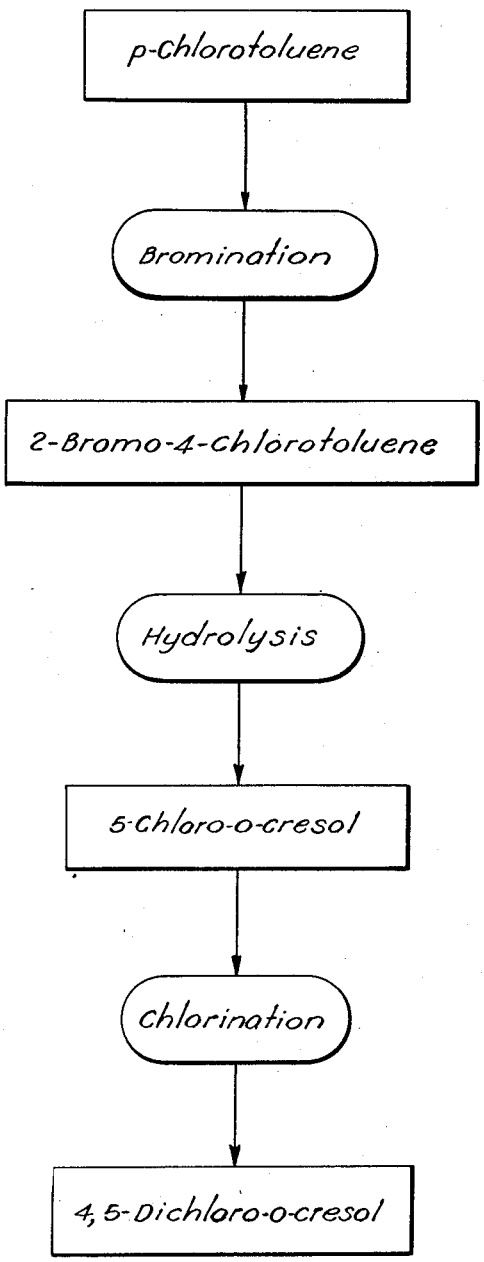
INVENTORS
Floyd L. Beman
Andrew J. Dietzler
BY Griswold & Burdick
ATTORNEYS United States Patent Office 2,778,857
Patented Jan. 22, 1957

METHOD FOR MAKING 5-CHLORO-O-CRESOL AND 4,5-DICHLORO-O-CRESOL

Floyd L. Beman and Andrew J. Dietzler, Midland, Mich., assignors to The Dow Chemical Company, Midland, Mich., a corporation of Delaware Application April 26, 1954, Serial No. 425,752

8 Claims. (Cl. 260—623)

This invention pertains to a new and improved method for the preparation of 5-chloro-o-cresol and 4,5-dichloro-o-cresol from p-chlorotoluene whereby substantially pure products can readily be obtained.

By "5-chloro-o-cresol" is meant 5-chloro-2-methylphenol, and by "4,5-dichloro-o-cresol" is meant 4,5-dichloro-2-methylphenol, the substituents in the benzene ring being numbered starting with the hydroxyl group as 1 and proceeding toward the methyl group as 2.

The preparation of a chlorophenolic compound by direct chlorination of the parent phenolic compound usually results in the formation of a mixture comprising undesired products having more and/or less than the desired degree of chlorination and also comprising position isomers of the desired product. The separation of such a mixture is often difficult and sometimes only poor yields of the desired product are obtained. The direct chlorination method is particularly inappropriate when the chloro substituent in the desired product occupies a position meta to the phenolic hydroxyl group, as it does in 5-chloro-o-cresol and in 4,5-dichloro-o-cresol. The direct mono-chlorination of o-cresol leads to a mixture predominating in 4- and 6-chloro-o-cresols, and the dichlorination leads to 4,6-dichloro-o-cresol, very little, if any, of the 5-chloro-o-cresol or 4,5-dichloro-o-cresol being obtained.

It has also been proposed to prepare chloro-cresols by hydrolysis of one of the chloro-substituents of a polychlorotoluene. However, the mono-hydrolysis of a polychlorotoluene is not selective and mixtures of chlorocresols are obtained. The method is not adapted for making pure 5-chloro-o-cresol or 4,5-dichloro-o-cresol.

The known methods for preparation of 5-chloro-o-cresol and of 4,5-dichloro-o-cresol are by indirect procedure. For example, the preparation of 5-chloro-o-cresol has been effected by the acid catalyzed decomposition of 5-chloro-2-methylbenzenediazonium salt, the latter having been made by diazotization of 5-chloro-o-toluidine which had been made by reduction of 4-chloro-2-nitrotoluene. The last named material is not a readily available starting material and the necessary sequence of reactions is tedious and expensive. Such a process does not lend itself to commercial production.

It is an object of this invention to provide a new and improved method for making 5-chloro-o-cresol and/or 4,5-dichloro-o-cresol. A further object is to provide such a method for making 5-chloro-o-cresol and/or 4,5-dichloro-o-cresol from readily available starting materials. A specific object is to provide such a method for making 5-chloro-o-cresol and/or 4,5-dichloro-o-cresol from p-chlorotoluene. Another object is to provide such a method which is readily adaptable to commercial production. Other objects and advantages will be evident from the following description of the invention.

The objects of this invention are attained in a new and improved method for making 5-chloro-o-cresol and/or 4,5-dichloro-o-cresol from p-chlorotoluene, which method comprises steps, hereinafter more completely described, which involve the following chemical reactions:

p-Chlorotoluene is brominated, whereby 2-bromo-4-chlorotoluene is produced;

2-bromo-4-chlorotoluene is hydrolyzed, whereby 5-chloro-o-cresol is produced;

5-chloro-o-cresol is chlorinated, whereby 4,5-dichloro-o-cresol is produced.

The drawing is a diagrammatic flow sheet showing the steps of this process.

By such method, 5-chloro-o-cresol and/or 4,5-dichloro-o-cresol can be obtained in good yield and of good quality from readily available starting materials. The end products and intermediate products are readily separated from their synthesis reaction mixtures, and recovered starting materials can be utilized in succeeding runs. The process is readily adapted to commercial operation.

In the first step of the process whereby 5-chloro-o-cresol and/or 4,5-dichloro-o-cresol is prepared from p-chlorotoluene, the latter compound is brominated to produce 2-bromo-4-chlorotoluene. A suitable procedure is to add bromine to liquid p-chlorotoluene in the presence of a carrier catalyst, e. g. 0.5 to 2 percent by weight, based on the p-chlorotoluene, of ferric chloride, aluminum chloride, antimony pentachloride, the aluminum-mercury couple or iodine. The temperature should be controlled below about 50° C., preferably from 0° C. to 30° C. The bromine is preferably added gradually so as to avoid a high concentration of free bromine in the reaction mixture and usually the amount of bromine charged is less than that theoretically required for reaction on an equimolecular basis with the p-chlorotoluene charge. For example, 0.5 to 0.9 molecular proportion of bromine is usually charged for each molecular proportion of p-chlorotoluene. After completion of the bromination reaction, the reaction mixture is preferably washed with water to extract and remove the catalyst and is preferably treated with alkali, e. g. washed with sodium hydroxide solution, to remove acidic materials such as hydrogen bromide. From the neutral reaction product, unreacted p-chlorotoluene and the 2-bromo-4-chlorotoluene product can be separated e. g. by fractional distillation, preferably under reduced pressure.

By the procedure just described substantially pure 2-bromo-4-chlorotoluene can be obtained in good yield. The 2-bromo-4-chlorotoluene is suitable for use in succeeding steps of the method of this invention.

In the hydrolysis step of the method of the invention, 2-bromo-4-chlorotoluene is hydrolyzed, whereby 5-chloro-o-cresol is produced. A suitable procedure is to agitate 2-bromo-4-chlorotoluene with an excess of aqueous alkali at an elevated temperature, preferably in the presence of a mutual solvent, i. e., a liquid soluble in the aqueous alkali and capable of increasing the solubility of the 2-bromo-4-chlorotoluene in the aqueous alkali mixture. Preferably the 2-bromo-4-chlorotoluene is admixed with a solution comprising water, an alcohol, e. g. methanol or glycol, as the mutual solvent, and an excess of an alkali metal hydroxide such as sodium hydroxide or potassium hydroxide, and the liquid mixture is heated in a closed vessel, with agitation, under a pressure at least as great as the autogenous pressure, to a temperature between 125° and 240° C., preferably between 170° and 220° C. Usually from about 2 to about 5 molecular proportions of alkali are employed per molecular proportion of 2-bromo-4-chlorotoluene. Any alkali metal hydroxide, i. e., a hydroxide of lithium, sodium, potassium, rubidium or caesium, or alkaline earth metal oxide or hydroxide, i. e. an oxide or hydroxide of magnesium, calcium, barium or strontium, can be used. The concentration of alkali is not critical, but is usually from about 5 to about 30 percent by weight of the aqueous medium. The proportion of mutual solvent is not critical, but is usually from about 5 to about 90 percent by weight of the aqueous alkali mixture. The reaction is continued until a substantial proportion of the 2-bromo-4-chlorotolene has been hydrolyzed, as shown by analysis of a sample portion, e. g. by titration, usually for 2–30 hours.

The hydrolysis reaction mixture can be treated to recover unreacted 2-bromo-4-chlorotoluene and to collect the 5-chloro-o-cresol product. For example, the reaction mixture resulting from the hydrolysis of 2-bromo-4-chlorotoluene with aqueous alkali in methanol solvent can be distilled to remove the methanol while adding water to the residue if necessary to keep the alkali and alkali salt of the cresol product in solution. After the methanol has been removed, the unreacted 2-bromo-4-chlorotoluene separates as a layer substantially insoluble in the aqueous alkali solution of the cresol hydrolysis product. The layers can be separated and traces of 2-bromo-4-chlorotoluene can be removed from the aqueous alkali solution of the cresol by extraction or by steam distillation, if desired. The aqueous alkaline solution can then be acidified and cooled whereupon the 5-chloro-o-cresol precipitates and usually crystallizes and can be separated, washed, dried and recrystallized if desired.

It is surprising that the hydrolysis of 2-bromo-4-chlorotoluene, under the conditions as described above, occurs almost exclusively and selectively on the 2-bromo-substituent, only a negligible amount of hydrolysis occurring on the 4-chloro-substituent. A consequence of such highly selective hydrolysis is that 5-chloro-o-cresol, which is difficult to obtain by previously known methods, can now be readily obtained from an available starting material in good yields, and in a pure state, being substantially free of isomeric chlorocresols.

In the preparation of 4,5-dichloro-o-cresol from p-chlorotoluene according to the method of this invention, 5-chloro-o-cresol, made as described hereinbefore, is chlorinated. The 5-chloro-o-cresol can be dissolved in a suitable chlorination solvent, e. g. chloroform, carbon tetrachloride or acetic acid, and chlorine passed into the solution with stirring, usually at a temperature of 10° C. to 80° C., preferably between about 20° and about 50° C., until a quantity of chlorine has been added approaching that theoretically equivalent on a molecular basis to the 5-chloro-o-cresol charge. After the complete addition of chlorine, the solvent can be removed by distillation, and the residue is crude 4,5-dichloro-o-cresol which usually crystallizes on cooling. The crude product can be fractionally distilled, preferably under reduced pressure, and/or recrystallized to effect a further purification if desired.

Surprisingly, the chlorination of 5-chloro-o-cresol as just described takes place almost exclusively on the nuclear position para to the cresolic hydroxyl group. Very little, if any, chlorination of 5-chloro-o-cresol occurs on other nuclear positions. The consequence of such selectivity is that 4,5-dichloro-o-cresol, which is difficult to obtain by hitherto known methods, can now be readily obtained by the method of this invention.

The following examples, taken together, illustrate the invention, but should not be construed as limiting its scope.

*Example 1.—Bromination of p-chlorotoluene*

Into a reactor equipped with a stirrer, reflux condenser, thermometer, dropping funnel and an external cooling bath, were charged 3968 grams of p-chlorotoluene and 39.7 grams of ferric chloride catalyst. The mixture was cooled and, with stirring, 4380 grams of bromine was dropped in over a period of about 26 hours, during which the temperature of the reaction mixture was maintained below 9° C., generally between 2° and 4° C. After the bromine addition, the reaction mixture was washed in a separatory funnel with 2 liters of water, then with 2 liters of aqueous 1.9 percent sodium hydroxide solution and again with 2 liters of water. The weight of the crude product was 6004 grams.

The washed crude bromination product was fractionally distilled under a reduced pressure, whereby lower-boiling materials, principally unreacted p-chlorotoluene, were collected up to a distillation temperature of 110° C. at 25 mm. mercury absolute pressure and weighed 899 grams.

The principal distillate, substantially 2-bromo-4-chlorotoluene, was collected at distillation temperatures between 110° and 115° C. under 25 mm. of mercury absolute pressure and weighed 4211 grams.

*Example 2.—Hydrolysis of 2-bromo-4-chlorotoluene*

Into an iron autoclave were charged 117 grams (0.57 gram-mole) of 2-bromo-4-chlorotoluene, prepared in the manner described above in Example 1, 120 mls. of water, 680 mls. of methanol and 80 grams (2 gram-moles) of sodium hydroxide. The autoclave was closed, and the reaction mixture was heated to, and maintained at, temperatures between 150° and 180° C. for 25.5 hours, with agitation. After the hydrolysis reaction, the methanol was distilled out of the reaction mixture and the aqueous residue was cooled, whereupon the unreacted 2-bromo-4-chlorotoluene separated. The recovered 2-bromo-4-chlorotoluene fraction amounted to 57.6 grams. The aqueous alkali layer was steam distilled to remove traces of 2-bromo-4-chlorotoluene, cooled to 20° C. and acidified with concentrated hydrochloric acid to pH 1. 5-chloro-o-cresol crystallized out, was collected, washed with water and dried to yield 29.7 grams of product melting at a temperature of 56°–61° C. The yield of 5-chloro-o-cresol corresponded to about 72 percent, based on the amount of 2-bromo-4-chlorotoluene which was consumed. Analysis of the aqueous alkali salt hydrolysis liquor showed the presence of 0.265 gram-equivalent of bromide ion and 0.027 gram-equivalent of chloride ion, giving evidence that only a small proportion of the hydrolysis had involved a chloro-substituent.

*Example 3.—Hydrolysis of 2-bromo-4-chlorotoluene*

Into a copper autoclave were charged 117 grams (0.57 gram-mole) of 2-bromo-4-chlorotoluene, prepared in the manner described in Example 1, 120 mls. of water, 680 mls. of methanol and 80 grams (2 gram-moles) of sodium hydroxide. The autoclave was closed and the reaction mixture was heated at a temperature of 200° C. for 2½ hours, with agitation. After the hydrolysis reaction, analysis showed the presence of 0.456 gram-equivalent of bromide ion and 0.02 gram-equivalent of chloride ion. The methanol was distilled out of the reaction mixture and the aqueous residue was cooled, whereupon the unreacted 2-bromo-4-chlorotoluene separated. The recovered 2-bromo-4-chlorotoluene fraction amounted to 14.5 grams, or 12.4 percent of the amount thereof initially charged. The aqueous alkali layer was steam distilled to remove traces of 2-bromo-4-chlorotoluene, cooled to 20° C. and acidified with concentrated hydrochloric acid to pH 1. 5-chloro-o-cresol crystallized out, was collected, washed with water and dried to yield 50.0 grams of product melting at a temperature of 59–60° C. The yield of 5-chloro-o-cresol obtained corresponded to about 76.7 percent of theoretical, based on the amount of 2-bromo-4-chlorotoluene which was hydrolyzed.

*Example 4.—Chlorination of 5-chloro-o-cresol*

Into a solution of 21.4 grams (0.15 gram-mole) of 5-chloro-o-cresol (prepared in the manner described in Examples 2 and 3) dissolved in 190 mls. of chloroform, was passed 10 grams (0.14 gram-mole) of chlorine over a period of about 30 minutes, during which the temperature was maintained at about 18°–45° C. After the chlorine addition, the chloroform was distilled off under atmospheric pressure to a residue temperature of about 90° C. The residue was cooled to 30° C. and seeded, whereupon the entire residue crystallized. The yield of crude 4,5-dichloro-o-cresol was 89 percent of theoretical.

We claim:

1. In a method for making a chloro-o-cresol having a chlorine atom in the 5-position of the molecule, the step of making 5-chloro-o-cresol by hydrolyzing 2-bromo-4-chlorotoluene by heating a liquid mixture of 2-bromo-4-chlorotoluene and a molecular excess of an aqueous alkali under a pressure at least as great as the autogenous pressure at a hydrolyzing temperature between 125° and 240° C.

2. In a method according to claim 1, the step of heating a liquid mixture of 2-bromo-4-chlorotoluene, a molecular excess of an alkali metal hydroxide, water and methanol under a pressure at least as great as the autogenous pressure at a hydrolyzing temperature between 170° and 220° C.

3. A method for making 5-chloro-o-cresol which comprises heating a liquid mixture of 2-bromo-4-chlorotoluene and a molecular excess of aqueous alkali at a hydrolysis temperature between 125° and 240° C.

4. A method according to claim 3 wherein the alkali is an alkali metal hydroxide.

5. A method according to claim 3 wherein the alkali is sodium hydroxide.

6. A method for making 5-chloro-o-cresol which comprises heating a liquid mixture of 2-bromo-4-chlorotoluene, a molecular excess of an alkali metal hydroxide, water and methanol at a hydrolysis temperature between 170° and 220° C.

7. A method according to claim 6 wherein the alkali metal hydroxide is sodium hydroxide.

8. A method for making 5-chloro-o-cresol which comprises preparing a liquid mixture of 2-bromo-4-chlorotoluene and an aqueous alkali solution, which aqueous alkali solution contains water, methanol in amount corresponding to from about 5 to about 50 percent by weight of the aqueous alkali solution, and sodium hydroxide in amount corresponding to from about 5 to about 30 percent by weight of the aqeuous alkali solution and corresponding to from about 2 to about 5 moles of sodium hydroxide per mole of 2-bromo-4-chlorotoluene in the starting mixture, heating that liquid mixture at a hydrolysis temperature between 170° and 220° C. until a substantial hydrolysis of 2-bromo-4-chlorotoluene occurs, and separating 5-chloro-o-cresol from the hydrolysis reaction mixture.

References Cited in the file of this patent

UNITED STATES PATENTS

| | | |
|---|---|---|
| 1,934,656 | Britton et al. | Nov. 7, 1933 |
| 1,995,568 | Jacobi et al. | Mar. 26, 1935 |

OTHER REFERENCES

Ullmann et al.: Chem. Abstracts, vol. 1 (1906), page 436.

Cohen et al.: Jour. Chem. Soc. (London), vol. 105 (1914), pages 1910, 1912.

Zincke et al.: Annalen der Chemie (Liebig), vol. 417 (1918), page 207. Abstracted in Chem. Abstracts, vol. 13 (1919), pp. 1830–1.